US006163552A

United States Patent [19]
Engelberth et al.

[11] Patent Number: 6,163,552
[45] Date of Patent: Dec. 19, 2000

[54] ARTICLE COMPRISING AN OPTICAL FIBER CASCADED RAMAN RESONATOR

[75] Inventors: Jon W. Engelberth, Denville; Gloria R. Jacobovitz-Veselka, Morganville, both of N.J.

[73] Assignee: Lucent Technologies Inc., Murray Hill, N.J.

[21] Appl. No.: 09/134,296

[22] Filed: Aug. 14, 1998

[51] Int. Cl.[7] .................................................... H01S 3/30
[52] U.S. Cl. .................... 372/3; 372/3; 372/102; 372/6; 372/99; 372/23; 372/72; 372/27; 372/28; 372/26
[58] Field of Search .................... 372/3, 102, 6, 372/99, 23, 72, 27, 28, 26, 108

[56] References Cited

U.S. PATENT DOCUMENTS

| | | |
|---|---|---|
| 5,323,404 | 6/1994 | Grubb . |
| 5,623,508 | 4/1997 | Grubb et al. ................................ 372/3 |
| 5,815,518 | 9/1998 | Reed et al. .................................. 372/6 |
| 5,966,480 | 10/1999 | LeGrange et al. ......................... 385/27 |

OTHER PUBLICATIONS

Agrawal, G.P., "Nonlinear Fiber Optics", 2nd Edition, Academic Press, 1995.
Rottwitt, K. et al., "OFC 98", San Jose, CA.

*Primary Examiner*—Frank G. Font
*Assistant Examiner*—Delma R. Flores Ruiz
*Attorney, Agent, or Firm*—Eugen E. Pacher

[57] ABSTRACT

A multi-wavelength Raman radiation source is disclosed. The source receives pump radiation at a given wavelength, e.g., 1100 nm, and has outputs at two or more longer wavelengths, e.g., 1450 nm and 1480 nm. The cascaded Raman resonator comprises, for each desired output wavelength, an optical cavity formed by a high reflectivity grating and a low reflectivity grating, with both having the same center wavelength, equal to the desired output wavelength. Multi-wavelength Raman radiation sources have a variety of applications, e.g., they can advantageously be used in a remotely pumped optical fiber communication system.

7 Claims, 3 Drawing Sheets

ARTICLE COMPRISING AN OPTICAL FIBER CASCADED RAMAN RESONATOR

FIELD OF THE INVENTION

This invention pertains to optical fiber cascaded Raman resonators (CRR) and to articles that comprise the CRR (e.g., a Raman laser, or an optical fiber communication system that includes a Raman laser).

BACKGROUND OF THE INVENTION

Optical fiber Raman lasers are known. See, for instance, U. S. Pat. No. 5,323,404. All herein cited references are incorporated herein by reference. Briefly, in a Raman laser, a cascaded Raman resonator (CRR) receives pump radiation of wavelength $\lambda_p$ (typically from a laser diode array and a cladding pumped fiber laser), and shifts radiation power in one or more steps to a desired output wavelength $\lambda_s > \lambda_p$. The step size (frequently referred to as the Raman shift) typically is about 13.2 THz, corresponding to the maximum in the Raman gain spectrum of silica. The step size is determined by reflectors (typically refractive index gratings) in the optical fiber.

FIG. 1 schematically depicts an exemplary prior art CRR 10. The pump source can be conventional (e.g., comprising a diode laser array and a cladding pumped fiber laser) and is not shown. In FIG. 1, pump light of wavelength $\lambda_p$ propagates from fiber 11 to fiber 12 through fibers 13, 14 and 15, all single mode silica-based fibers. Fiber 15 typically is of order 1 km in length, and advantageously has low effective area to maximize Raman gain. Numerals 161, 162–16n are conventional high reflectivity (e.g., >90%) refractive index gratings. Downstream gratings 171, 172 . . . 17n are matched in center wavelength to upstream gratings 161 . . . 16n, thereby providing resonance cavities at the wavelengths that correspond to the respective center wavelengths. One of gratings 171–17n (e.g., 17n) is a low reflectivity grating, with all others having high reflectivity. By way of example, the pump wavelength $\lambda_p$ is 1117 nm, the output wavelength $\lambda_s$ is 1480 nm, and the intermediate Stokes-Raman orders are 1175, 1240, 1310 and 1395 nm, corresponding to the center wavelengths of the respective grating pairs. FIG. 2 shows the measured Raman gain spectrum for $\lambda_p = 1\mu m$. See G. P. Agrawal, "Nonlinear Fiber Optics", 2nd edition, Academic Press, 1995.

The prior art CRR of FIG. 1 comprises an optional high reflectivity pump reflector grating 18 (with center wavelength $\lambda_p$), as well as a low reflectivity (e.g., about 5%) output grating of center wavelength $\lambda_s$. By way of example, the grating pair 161/171 corresponds to the first intermediate Stokes-Bragg order, and the pair 16n/17n corresponds to the output wavelength. In a CRR as described, the light of an intermediate Raman-Stokes order circulates in its resonator until the light is substantially entirely converted into the next Raman-Stokes order. FIG. 3 of the '404 patent shows an exemplary spectrum of a prior art CRR.

It will be understood that the arrangement of the various refractive index gratings is not critical, since in general there is relatively little interaction between light and a grating of the type relevant herein unless the wavelength of the light is essentially equal to the center wavelength of the grating. See co-assigned U.S. patent application Ser. No. 08/871,023, filed Jun. 6, 1997 by Reed et al., which discloses that appropriate ordering of the reflectors can result in conversion efficiency improvement of order 1%.

Conventionally, the pump radiation of wavelength $\lambda_p$ is derived from a high power pump that typically comprises a commercially available diode laser array and a cladding pumped fiber laser that serves to convert the multimode radiation from the diode laser array into single mode radiation of the appropriate wavelength.

CRRs as described above are finding a variety of uses, e.g., providing 1480 nm pump radiation for EDFAs, or providing pump radiation for Raman amplification of signal wavelengths of about 1.55 $\mu m$ from 1100 nm pump light.

In principle it is possible to provide a dedicated Raman laser for each desired output wavelength. See, for instance, K Rottwitt et al., *OFC*98, San Jose, Calif. However, provision of a multiplicity of Raman lasers, one for each desired wavelength, typically would be prohibitively expensive. Thus, it would be desirable to have available a Raman laser that produces output radiation of two or more predetermined wavelengths from a single pump wavelength $\lambda_p$. This application discloses such a multi-wavelength Raman laser.

SUMMARY OF THE INVENTION

The invention is embodied in a multi-wavelength CRR adapted for receiving pump radiation of wavelength $\lambda_p$, and for providing output radiation of at least two different wavelengths $\lambda_{s,1}$ and $\lambda_{s,2}$. A significant aspect of the invention is the recognition that the frequency shift between adjacent Raman orders need not be limited to about 13.2 THz, as is prior art practice, but can be selected to be substantially any desired value in the approximate range 0–40 THz, being mindful of decreased conversion efficiency for frequency shifts that differ substantially from the peak frequency shift of about 13.2 THz.

More specifically, the invention is embodied in an article that comprises a CRR comprising a length of silica-based single mode optical fiber. The optical fiber comprises a first multiplicity of upstream refractive index gratings and a second multiplicity of downstream refractive index gratings, with single mode optical fiber disposed between said upstream and downstream refractive index gratings. Each refractive index grating has a center wavelength and a reflectivity at the center wavelength . The CRR is adapted for receiving pump radiation of wavelength $\lambda_p$ at a location upstream of said upstream refractive index gratings, and is furthermore adapted for providing, at a location downstream of the downstream refractive index gratings, output radiation of wavelength $\lambda_{s,1} > \lambda_p$.

Significantly, the CRR is a multi-wavelength CRR that is adapted for providing, at the location downstream of the downstream refractive index gratings, at least one further output radiation of wavelength $\lambda_{s,2} > \lambda_p$, wherein said first multiplicity of upstream refractive index gratings comprises a first and second refractive index grating, and said second multiplicity of downstream refractive index gratings comprises a third and fourth refractive index grating. The first and third refractive index gratings are selected to have center wavelengths $\lambda_{s,1}$, and the second and fourth refractive index gratings are selected to have center wavelength $\lambda_{s,2}$. The first and third refractive index gratings are selected such that the first refractive index grating has a reflectivity at the center wavelength $\lambda_{s,1}$ that is larger than the reflectivity at the center wavelength $\lambda_{s,1}$ of the third refractive index grating, and the second and fourth refractive index gratings are selected such that the second refractive index grating has a reflectivity at the center wavelength $\lambda_{s,2}$ that is larger than the reflectivity at the center wavelength $\lambda_{s,2}$ of the fourth refractive index grating.

Typically, the reflectivities at the respective center wavelengths of the first and second refractive index gratings are greater than 50%, and the reflectivities at the respective center wavelengths of the third and fourth refractive index gratings are less than 50%.

Embodiments of the invention are not limited to two output wavelengths but can have three or even more different output wavelengths, limited substantially only by power considerations.

The refractive index gratings can be conventional, with the "high reflectivity" first and second gratings desirably and typically having 80% or more reflectivity, and the "low reflectivity" third and fourth gratings typically having 20% or less reflectivity.

The single mode fiber between the two sets of refractive index gratings typically has relatively small core size, to facilitate Raman shifting, and typically has a length of order 1 km, e.g., in the range 0.3–3 km.

In addition to the above recited refractive index gratings, a CRR according to the invention also has one or more pairs of essentially identical gratings, with one member of a given pair in the upstream set, and the other number of the given pair in the downstream set. These pairs form resonator cavities that cause Raman shifting of the radiation.

Optionally, the set of downstream gratings comprises a high reflectivity grating of center wavelength $\lambda_p$, to serve as pump reflector. The pump reflector typically is, but-need not be, the last grating in the downstream direction of the CRR.

Preferred embodiments of the invention comprise means for controlling the output power at the respective wavelengths. Such control can be provided by means of an adjustable coupler at the output, or by tuning or de-tuning of a grating pair.

CRRs according to the invention can be provided with an appropriate pump radiation source to yield a Raman resonator radiation source (frequently referred to as a Raman laser). Such a radiation source can be used in a variety of ways, e.g., to provide pump radiation for an EDFA or for a distributed Raman amplifier, all in optical fiber communication systems, or for a combination of a zero loss dispersion-compensating fiber and EDFA for a combination of remote pumping and amplification of the signal. See also co-assigned U.S. patent application Ser. No. 081928,580, filed Sep. 12, 1997, by Hansen et al.

The drawings are not to scale or proportional.

DETAILED DESCRIPTION

Figure 1:
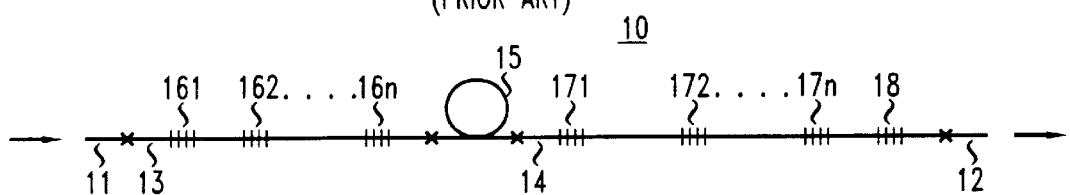
FIG. 1 schematically depicts a prior art CRR.
Figure 2:
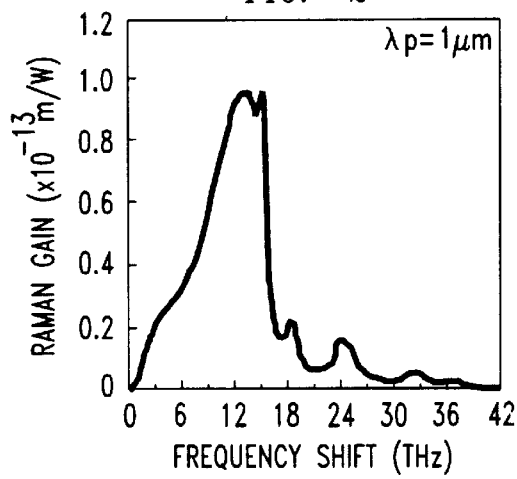
FIG. 2 shows the silica Raman gain spectrum.

As exemplified by FIG. 2, the Raman gain spectrum of silica exhibits gain over a spectral region extending about 40 THz, with a broad peak at about 13.2 THz. Thus, high power pump light can produce Raman gain substantially anywhere in this 40 THz range, providing flexibility in the design of a CRR. In particular, existence of this relatively broad gain band makes possible design of multi-wavelength CRRs, including CRRs with relatively widely spaced output wavelengths. At a wavelength of about 1.1 μm, a frequency shift of —13 Thz corresponds to a wavelength shift of about 53 nm, and at a wavelength of about 1.5 μm a frequency shift of —13 THz corresponds to a wavelength shift of about 72 nm.

In a CRR according to the invention, the downstream set of refractive index gratings includes, for each output wavelength, a "low reflectivity" grating having center wavelength essentially equal to a desired output wavelength, and the upstream set of refractive index gratings includes, for each output wavelength, a "high reflectivity" grating having center wavelength essentially equal to the desired output wavelength. Herein a center wavelength is "essentially" equal to another center wavelength if the center wavelengths differ at most due to unavoidable manufacturing variations.

Figure 3:
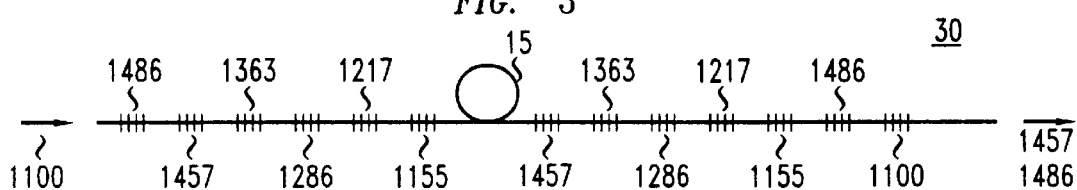
FIGS. 3 and 4 schematically show exemplary CRRs according to the invention.
Figure 4:
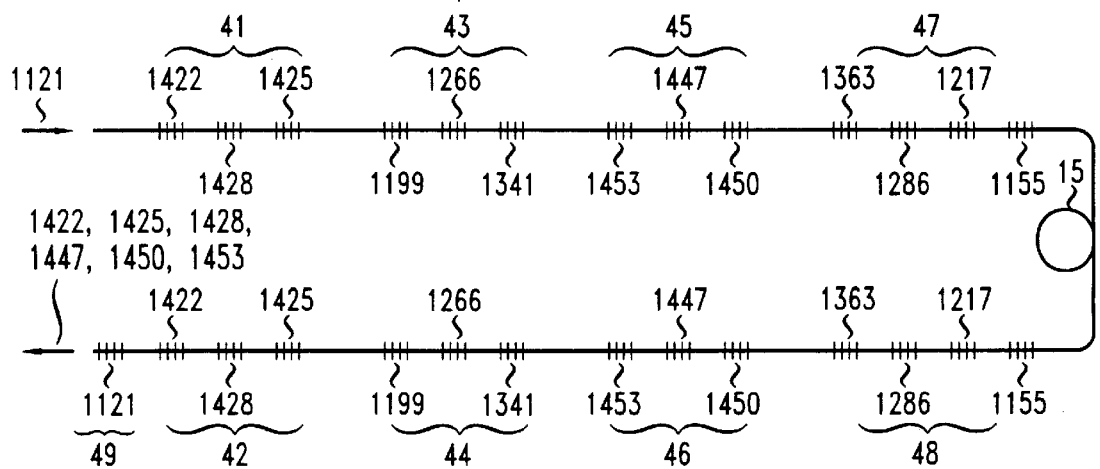

FIG. 3 schematically shows an exemplary CRR 30 according to the invention. In FIGS. 3 and 4, all four digit numbers are in nanometers, and splices are not shown.

In the CRR of FIG. 3, the upstream gratings as well as the downstream gratings are formed in conventional manner in silica-based single mode optical fiber. Raman-active fiber 15 is 0.5 km of silica-based single mode optical fiber substantially like the corresponding fiber of the '404 patent.

In FIG. 3, $\lambda_p$ is 1100 nm, and $\lambda_{s,1}$ and $\lambda_{s,2}$ are 1457 and 1486 nm, respectively. Pump radiation $\lambda_p$ is coupled into the upstream end of the CRR, propagates therethrough, and the unconverted pump radiation is reflected by 1100 nm pump reflector at the downstream end of the CRR. The grating pairs with center wavelengths 1155, 1217, 1286 and 1363 nm all are high reflectivity gratings (reflectivity at the center wavelength $\geq$90%). The upstream 1457 and 1486 nm gratings are also high reflectivity gratings, but the corresponding downstream gratings are low reflectivity gratings (reflectivity at center wavelength respectively about 20% and about 63%), frequently referred to as "output couplers". Due to the presence of the two high reflectivity reflectors and the two output couplers at 1457 and 1486 nm, the CRR of FIG. 3 can provide output variation at 1457 and 1486 nm wavelength.

The placement of the output couplers is not critical, provided they are disposed downstream of Raman fiber 15. For instance, the 1457 nm output coupler could be placed just downstream or upstream of the 1486 nm coupler.

FIG. 4 schematically shows a further exemplary embodiment of the invention, adapted for producing six different wavelengths from pump radiation of wavelength 1121 nm. All upstream gratings (designated by numerals 41, 43, 45 and 47) are high reflectivity gratings, and the downstream gratings comprise high reflectivity gratings (designated 44 and 48) as well as six output couplers, namely the gratings designated 42 and 46. Grating 49 is a pump reflector.

Pump radiation enters the CRR and is Raman shifted in conventional fashion to 1199 nm, then to 1266 nm, and then to 1341 nm. The latter then is Raman shifted to 1422, 1425 and 1428 nm.

Pump radiation is also Raman shifted to 1155 nm, then 1217 nm, 1286 nm and 1363 nm. The latter then is Raman shifted to 1447, 1450 and 1453. Output couplers 42 and 46 facilitate emission of radiation of wavelengths 1422, 1425, 1428 nm, and of wavelengths 1447, 1450 and 1453 nm.

An important aspect of CRRs in general, and of multi-wavelength CRRs according to the invention in particular, is the selection of the center wavelengths of the gratings. The goal of the selection is efficient shifting of the light from the pump wavelength $\lambda_p$ to the desired output wavelengths.

Exemplarily, for given $\lambda_p$, $\lambda_{s,1}$ and $\lambda_{s,2}$, the gratings advantageously are selected such that, for each given set of resonators, the wavelength differences between adjacent gratings are approximately equal. Advantageously, the gratings are selected such that the corresponding frequency is, exemplarily, in the approximate range 7–25 THz.

In the figures, the gratings are shown disposed in a particular order, e.g., with increasing center wavelengths in the downstream direction. This was done for the sake of clarity but is not a necessary feature. Indeed, the order in which the members of a set of gratings are disposed in the fiber in general is not critical.

Figure 5:
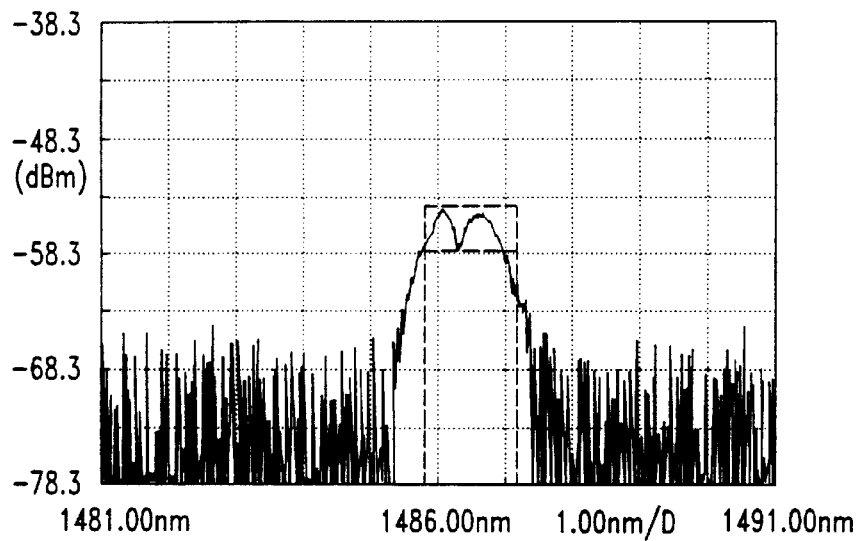
FIGS. 5 and 6 show spectral data for an exemplary Raman laser according to the invention.
Figure 6:
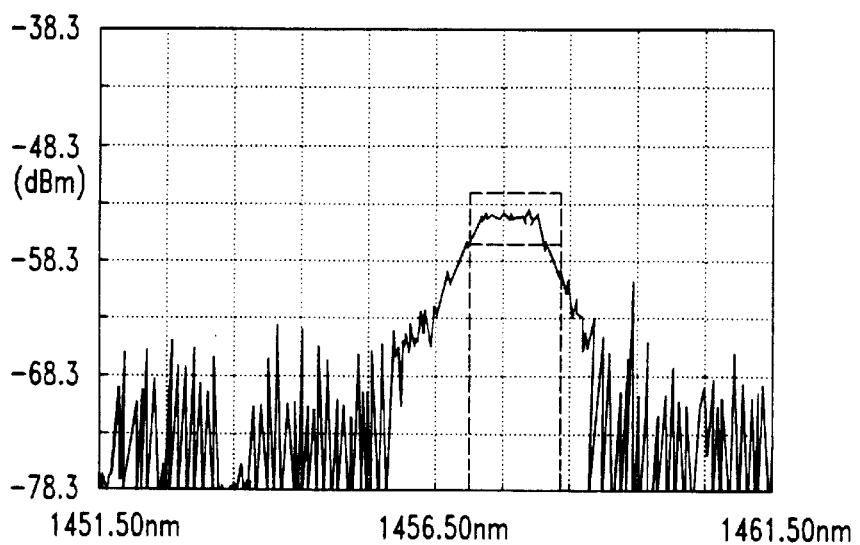

FIGS. 5 and 6 show the relevant portions of the output spectrum of a CRR substantially as shown in FIG. 3. The spectra clearly show significant light intensity at about 1486 and 1457 nm, respectively. Optimization of the CRR is expected to result in even greater intensity at the desired output wavelengths.

In many applications of multi-wavelength CRRs according to the invention, it will be desirable to be able to control the output power at one or another output wavelength. This can be accomplished, for instance, by means of an adjustable coupler at the output of the CRR. Suitable couplers are commercially available.

The power can also be controlled by tuning or de-tuning one or more resonance cavities. Such tuning or de-tuning is readily accomplished by application of stress to one grating of a pair of gratings, and/or by changing the temperature of a grating of a pair, resulting in a shift of the center wavelength of the grating. It will be understood that the efficiency of a CRR increases with improved tuning of the resonance cavities, and decreases with de-tuning of the cavities. In other words, changing the center wavelength of a grating such that said center wavelength is not exactly equal to the center wavelength of the other grating of a pair, decreases the cavity quality factor (Q), as compared to the Q of the resonance cavity with exactly matched pair.

Figure 7:
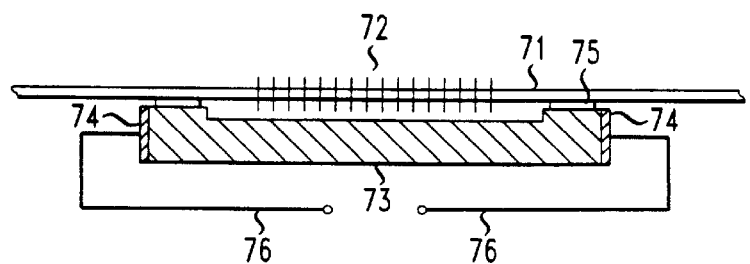
FIG. 7 ally depicts a turnable grating of a CRR.

FIG. 7 schematically shows an exemplary tunable grating for use in a CRR according to the invention. Optical fiber 71, comprising refractive index grating 72, is attached by adhesive or other appropriate means 75 to piezoelectric member 73. Appropriately placed electrodes 74 and conductors 76 facilitate application of a voltage across the member, such that the length of the member (and consequently the repeat distance A of the grating) is a function of the applied voltage.

By way of further example, A can also be changed by changing the temperature of the fiber region that contains the grating. This is accomplished for instance by enclosing the grating in a housing with a heating element therein.

Figure 8:
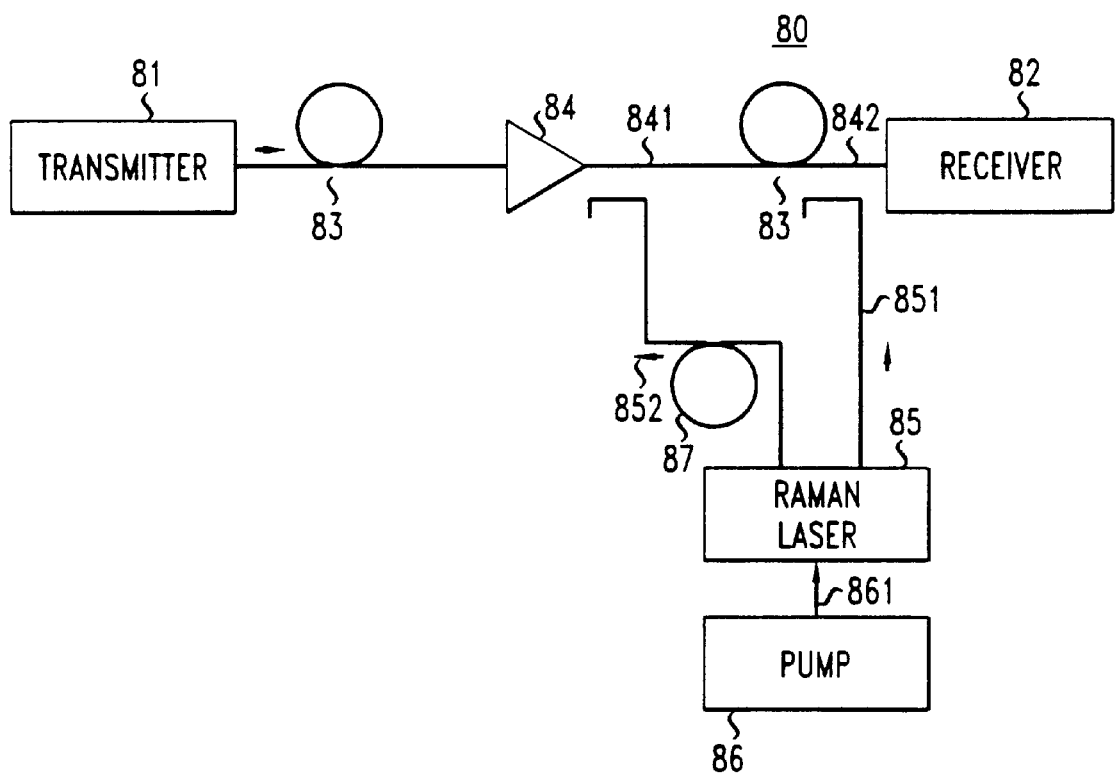
FIG. 8 schematically depicts an exemplary optical fiber communication system according to the invention.

FIG. 8 schematically depicts a remotely pumped communication system 80 that comprises a dual-wavelength CRR according to the invention. Transmitter 81 is signal-transmissively connected to receiver 82 by means of optical fiber 83. Between transmitter and receiver is disposed conventional EDFA (erbium doped fiber amplifier) 84. Dual wavelength Raman laser 85 is in the vicinity of the receiver, and is pumped by conventional pump source 86. Pump radiation 861 exemplarily has wavelength 1100 nm. The Raman laser is substantially as shown in FIG. 3, with output radiation of about 1450 nm and 1480 nm, and includes a coupler (not shown) for separating the two wavelengths. The 1450 nm radiation 851 is coupled into transmission fiber 83 in the vicinity of the receiver by means of conventional coupler 842. The radiation propagates in fiber 83 in the upstream direction and serves to provide distributed gain for signal radiation propagating from the transmitter to the receiver.

The 1480 nm radiation 852 propagates through fiber 87 to the vicinity of EDFA 84, and is coupled into fiber 83 just downstream of the EDFA. The 1480 nm radiation serves as pump radiation for the EDFA, which provides gain for the signal radiation that propagates from transmitter to receiver.

In FIG. 8, conventional features such as isolators, splices, etc., are not shown.

The invention claimed is:

1. An article comprising a cascaded Raman resonator comprising a length of silica-based single mode optical fiber with a first multiplicity of upstream refractive index gratings and a second multiplicity of downstream refractive index gratings spaced from, said upstream refractive index gratings, with each refractive index grating having a center wavelength and a reflectivity at the center wavelength, the cascaded Raman resonator being adapted for receiving pump radiation of wavelength $\lambda_p$ at a location upstream of said first multiplicity of upstream refractive index of g/ratings, and furthermore adapted for providing, at a location downstream of said second multiplicity of downstream refractive index gratings, output radiation of wavelength $\lambda_{s,1} > \lambda_p$;

Characterized in that
   a) the cascaded Raman resonator is a multi-wavelength cascaded Raman resonator adapted for providing, at the location downstream of the second multiplicity of downstream refractive index gratings, at least one further output radiation of wavelength $\lambda_{s,2} > \lambda_p$;
   b) the first multiplicity of upstream refractive index gratings comprises a first and a second refractive index grating, and the second multiplicity of downstream refractive index gratings comprises a third and a fourth refractive index grating, with said first and third refractive index gratings having center wavelength essentially equal to $\lambda_{s,1}$, and said second and fourth refractive index gratings having center wavelength essentially equal to $\lambda_{s,2}$; and
   c) said first refractive index grating has a reflectivity at the center wavelength $\lambda_{s,1}$ that is greater than the reflectivity of the third refractive index grating at the center wavelength $\lambda_{s,1}$, and said second refractive index grating has a reflectivity at the center wavelength $\lambda_{s,2}$ that is greater than the reflectivity of the fourth refractive index grating at the center wavelength $\lambda_{s,2}$.

2. Article according to claim 1, wherein each of said first and second refractive index gratings has a reflectivity at the respective center wavelengths that is greater than 50%, and each of said third and fourth refractive index gratings has a reflectivity at the respective center wavelength that is less than 50%.

3. Article according to claim 2, wherein said reflectivity greater than 50% is greater than 80%, and said reflectivity less than 50% is less than 20%.

4. Article according to claim 1, wherein each of said first multiplicity, of upstream refractive index gratings and said second multiplicity of downstream refractive index gratings comprises at least one further refractive index grating having a center wavelength less than at least one of $\lambda_{s,1}$ and $\lambda_{s,2}$.

5. Article according to claim 4, wherein said second multiplicity of downstream refractive index gratings comprises a refractive index grating having a center wavelength essentially equal to $\lambda_p$.

6. Article according to claim 4, comprising means for changing a quality factor Q of a resonant cavity formed by a pair of refractive index gratings.

7. Article according to claim 6, wherein said means comprise means for changing the stress on one refractive index grating of said pair of refractive index gratings, or said means comprise means for changing the temperature of one of the refractive index gratings of the pair of refractive index gratings.

* * * * *